United States Patent [19]

Mano

[11] Patent Number: 5,550,835
[45] Date of Patent: Aug. 27, 1996

[54] SUPERVISORY IMAGE COMMUNICATION SYSTEM THROUGH AN INTEGRATED SERVICE DIGITAL NETWORK

[75] Inventor: Kimihiro Mano, Tokyo, Japan

[73] Assignee: NEC Corporation, Japan

[21] Appl. No.: 280,786

[22] Filed: Jul. 26, 1994

[30] Foreign Application Priority Data

Jul. 27, 1993 [JP] Japan .................................. 5-203713

[51] Int. Cl.$^6$ .................................................. H04Q 5/00
[52] U.S. Cl. .................. 370/110.1; 340/517; 340/825.53
[58] Field of Search .................................. 370/62, 110.1, 370/92; 348/12, 13, 16; 340/517, 521, 522, 825.36, 825.37, 825.38, 825.44, 825.53; 358/434, 435, 440; 379/90

[56] References Cited

U.S. PATENT DOCUMENTS 5,229,850 7/1993 Toyoshima et al. ..................... 348/12
5,457,693 10/1995 Sasaki .................. 370/110.1

Primary Examiner—Benedict V. Safourer
Attorney, Agent, or Firm—Ostrolenk, Faber, Gerb & Soffen, LLP

[57] ABSTRACT

A supervisory image communication system by an ISDN includes a parent station and a plurality of child stations connected to the parent station by way of an ISDN basic interface and an ISDN switched network. Any of the child stations transmits call originating information to originate a call to the parent station, and the parent station supervises, in response to the call originating information, the state of the child station in accordance with image information subsequently inputted thereto from the child station. When a child station detects an emergency condition and tries to notify this to the parent station, a call originating reason representative of information of the emergency condition is added as sub-address information to call originating information to be transmitted. Upon acceptance of such call originating information from the child station, the parent station detects the sub-address information thus transmitted thereto and identifies the call originating reason. As a result, the parent station can identify the call originating reason from the child station before it responds to the originating call from the child station.

5 Claims, 2 Drawing Sheets

SUPERVISORY IMAGE COMMUNICATION SYSTEM THROUGH AN INTEGRATED SERVICE DIGITAL NETWORK

BACKGROUND OF THE INVENTION

1. Field of the Invention

This invention relates to a supervisory image communication system through an ISDN (Integrated Service Digital Network) wherein a parent station and a plurality of child stations are interconnected by way of an ISDN switched network such that any of the child stations transmits call originating information to originate a call to the parent station whereas the parent station supervises, in response to the call originating information from the child station, the state of the child station in accordance with image information inputted thereto from the child station.

2. Description of the Related Art

Conventional supervisory image communication systems of the type mentioned normally have such a form that, when, for example, a burglar sensor or a like emergency sensor provided at a child station is turned on, the child station first originates a call to a parent station which is a center station, and after the parent station responds to the originating call, the child station transmits emergency information corresponding to the turning on of the sensor to the parent station. Thus, the parent station receives the emergency information and inputs, in response to the thus received emergency information, image information thereafter transmitted thereto from the child station to supervise the state of the child station. In other words, the parent station gets a reason of origination of a call from a child station, that is, a type of a call such as an emergency call arising from turning on of such a burglar sensor as described above or from scanning of switches, status information of the child station and other necessary station after it is connected to the child station by way of a circuit.

With the conventional systems, since the parent station gets, when a call originating reason occurs with a child station, the call originating reason after it responds to the originating call from the child station in this manner, connection of a circuit must be performed even in response to an originating call which is originated by another reason unnecessary for supervision. This results in a disadvantage in that it requires a corresponding communication cost. Further, there is another disadvantage in that, for example, when an originating call from a second child station arrives at the parent station during communication of the parent station with a first child station, in order for the parent station to get a call originating reason of the second child station, complicated operations are required that the parent station stops the communication with the first child station and responds to the originating call from the second child station.

SUMMARY OF THE INVENTION

It is an object of the present invention to provide a supervisory image communication system by an ISDN wherein a parent station can get a reason of origination of a call from a child station without responding to the originating call from the child station.

In order to attain the object described above, according to the present invention, there is provided a supervisory image communication system by an ISDN, which comprises a parent station, a plurality of child stations connected to the parent station by way of an ISDN basic interface and an ISDN switched network, each of the child stations including means for transmitting call originating information to originate a call to the parent station, the parent station including means for supervising, in response to call originating information from any of the child stations, the state of the child station in accordance with image information inputted thereto from the child station, means provided in each of the child stations for adding sub-address information representative of a call originating reason to call originating information to be transmitted, sub-address information detection means provided in the parent station for detecting, upon acceptance of call originating information from any of the child stations, sub-address information added to the call originating information, and call originating reason identification means provided in the parent station for identifying a call originating reason from sub-address information detected by the sub-address information detection means.

In most cases, the call originating reason is emergency notification information for notifying an emergency condition of any of the child stations.

The sub-address information may include identification address information for identifying any of the child stations.

With the supervisory image communication system, for example, when a child station detects an emergency condition and tries to originate a call, a call originating reason representative of information of the emergency condition is added as sub-address information to call originating information to be transmitted. Upon acceptance of such call originating information from the child station, the parent station detects the sub-address information thus transmitted thereto and identifies the call originating reason. As a result, the parent station can identify the call originating reason from the child station before it responds to the originating call from the child station. Accordingly, the child station does not perform connection of a circuit in response to an originating call which is not necessary for supervision. Consequently, significant reduction of the communication cost can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 2:
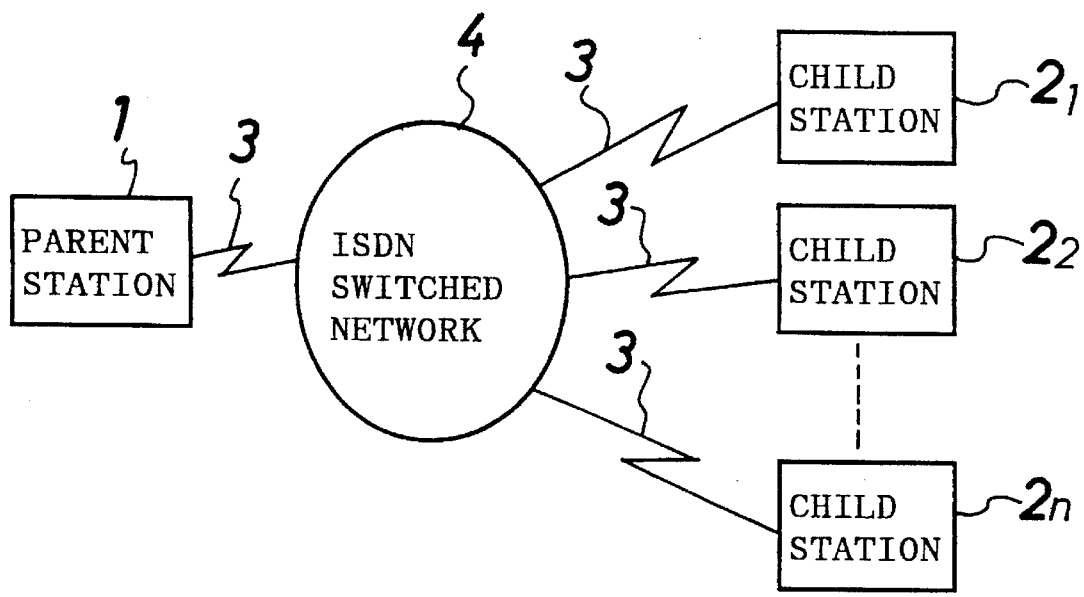
FIG. 2 is a diagrammatic view showing a general construction of the supervisory image communication system.

Referring first to FIG. 2, there is shown a general construction of a supervisory image communication system to which the present invention is applied. The supervisory image communication system shown includes a parent station 1 and a plurality of child stations $2_1$ to $2_n$. The parent station 1 and the child stations $2_1$ to $2_n$ are interconnected by individual ISDN basic interfaces (ISDN circuits) 3 and an ISDN switched network 4 which are each called "NET64".

Figure 1A:
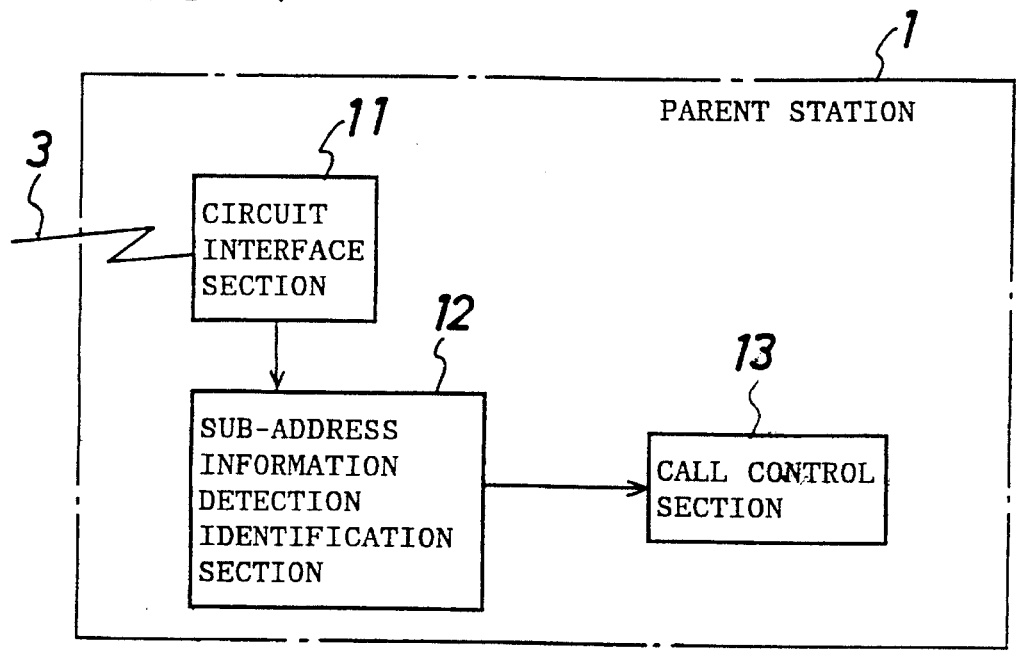
FIGS. 1(a) and 1(b) are block diagrams of a parent station and a child station, respectively, which constitute a supervisory image communication system according to the present invention.

Referring now to FIG. 1(a), a detailed construction of the parent station 1 is shown. The parent station 1 shown includes a circuit interface section 11 having a circuit terminating function and other necessary functions, a sub-address information detection identification section 12 for detecting sub-address information, which will be hereinafter described, to identify a reason of origination of a call, and a call control section 13 for controlling origination or termination of a call and so forth.

Figure 1B:
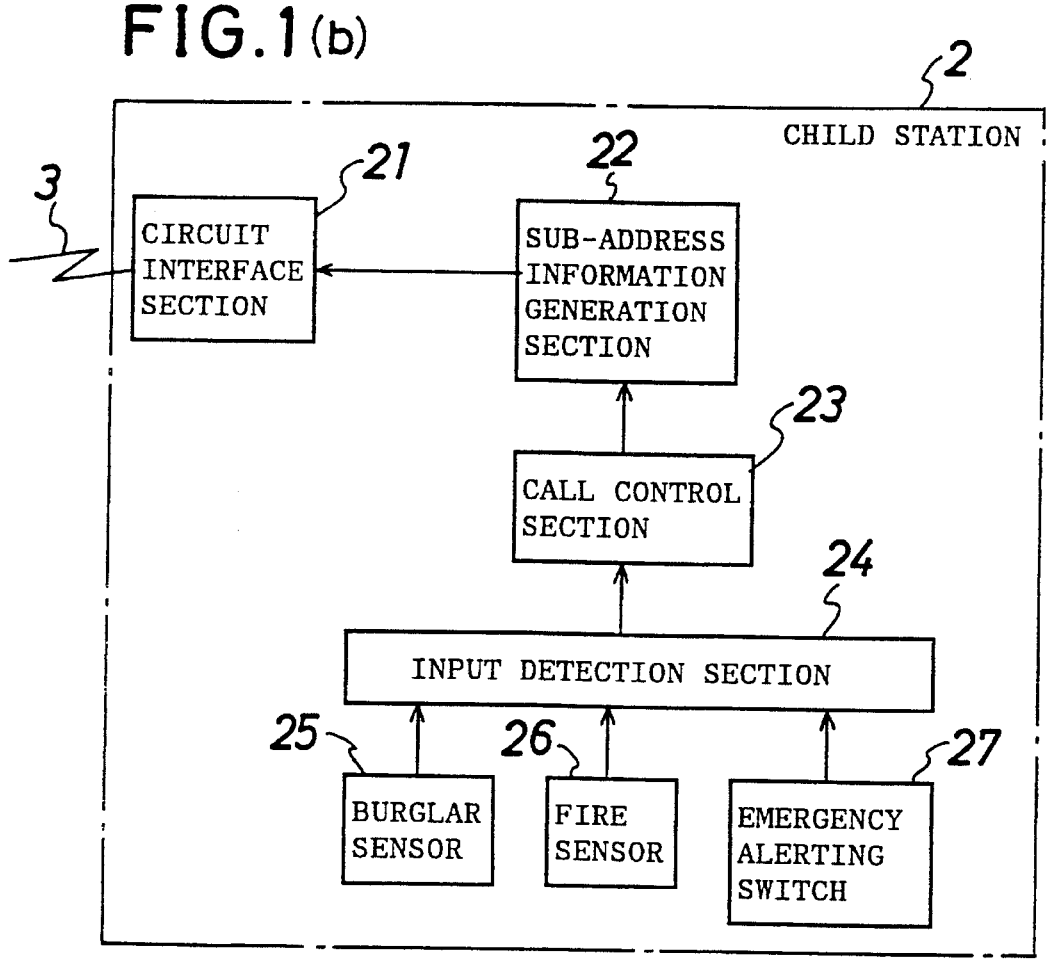

Referring now to FIG. 1(b), a detailed construction of each child station 2 is shown. The child station 2 shown includes a circuit interface section 21, a sub-address information generation section 22 for generating sub-address information mentioned hereinabove, a call control section 23, an input detection section 24, and a burglar sensor 25, a fire sensor 26 and an emergency alerting switch 27 which are connected to the input detection section 24.

In the supervisory image communication system constructed in such a manner as described above, if, for example, the burglar sensor 25 of a certain child station is turned on, then this is detected by the input detection section 24 and transmitted to the call control section 23. The call control section 23 originates a call to the parent station 1 in response to the turning on of the burglar sensor 25.

In this instance, the call control section 23 generates call originating information and instructs the sub-address information generation section 22 to generate sub-address information. Upon reception of the instruction, the sub-address information generation section 22 generates identification address information for identification of the child station 2 in which the sub-address information generation section 22 is provided and emergency information corresponding to the turning on of the burglar sensor as information of a series of sub-addresses. Then, the call control section 23 adds the sub-address information to the call originating information and transmits it to the corresponding ISDN basic interface 3 by way of the circuit interface section 21.

The call originating information transmitted from the child station 2 to the ISDN basic interface 3 and including the sub-address information arrives at the parent station 1 by way of the ISDN switched network 4 and the ISDN basic interface 3 connected thereto and is inputted to the sub-address information detection identification section 12 by the circuit interface section 11 in the parent station 1. The sub-address information detection identification section 12 detects the sub-address information added to the call originating information from the child station 2, identifies the call originating reason from the thus detected sub-address Information and transmits the call originating reason to the call control section 13. If the call control section 13 determines that the thus identified call originating reason (for example, emergency information originating from turning on of a sensor on the child station side or emergency notification originating from depression of an emergency alerting switch) is necessary for supervision of the child station 2, then it performs connection of a circuit to the child station 2 in response to the originating call from the child station 2. Thereafter, images successively picked up by an imaging camera or a like member not shown provided in the child station 2 are inputted to the parent station 1 by way of the ISDN circuit for the parent station 1 to supervise the child station 2.

By the way, the sub-address information mentioned above is usually used, where a plurality of terminals are connected to an ISDN basic interface, as an identification address of each terminal. In the present invention, the area for such sub-address information is expanded to assure an information area for a call originating reason, and when an emergency condition is detected at a child station 2, emergency notification information for notification of such emergency condition is added as sub-address information together with identification address information to call originating information to be transmitted to the parent station 1. Due to such construction, the call originating reason of a child station 2 can be identified by the parent station 1 before the parent station 1 responds to the originating call from the child station 2. Accordingly, the parent station 1 need not respond to an originating call which is not necessary for supervision, and consequently, the communication cost can be reduced as much.

It is to be noted that, while the child stations $2_1$ to $2_n$ in the embodiment described above are individually connected to the respective ISDN basic interfaces 3, if they are constructed only for origination of a call, then a plurality of child stations may be connected to an ISDN basic interface.

Having now fully described the invention, it will be apparent to one of ordinary skill in the art that many changes and modifications can be made thereto without departing from the spirit and scope of the invention as set forth herein.

What is claimed is:

1. A supervisory image communication system through an integrated service digital network "ISDN", comprising:

a parent station capable of responding to an originating call from a child station;

a plurality of child stations connected to said parent station by ISDN basic interfaces and an ISDN switched network;

each of said child stations including transmitting means transmitting call originating information to originate a call to said parent station;

sub-address information generation section at each of said child stations for adding sub-address information, representative of a reason for originating a call, to call originating information;

sub-address information detection means provided in said parent station for detecting, upon receiving call originating information from any of said child stations, sub-address information added to the call originating information; and call originating reason identification means provided in said parent station identifying a call originating reason from sub-address information detected by said sub-address information detection means, thereby the call originating reason being identified by the parent station along with an originating call.

2. A supervisory image communication system through an ISDN as claimed in claim 1, wherein the call originating reason is emergency notification information for notifying an emergency condition of any of said child stations.

3. A supervisory image communication system through an ISDN as claimed in claim 1, wherein the sub-address information includes identification address information for identifying any of said child stations.

4. A supervisory image communication system through an ISDN as claimed in claim 1, wherein said sub-address information detection means is a sub-address information detection identification section.

5. A supervisory image communication system through an ISDN as claimed in claim 1, wherein said call originating reason identification means is a sub-address information detection identification section.

* * * * *